Figure 1:
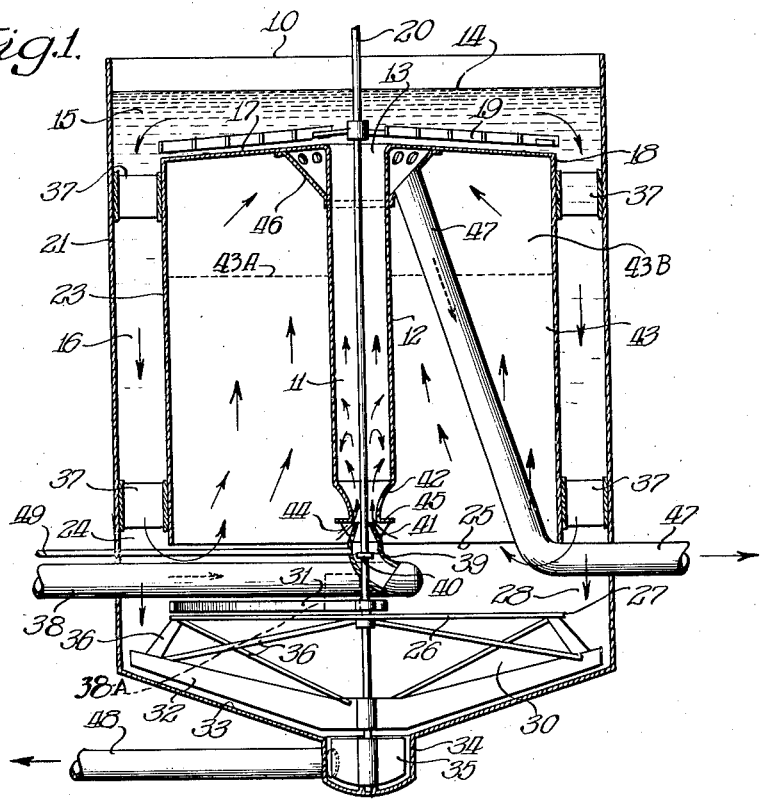

July 11, 1944.  F. D. PRAGER  2,353,358

PRECIPITATION AND COAGULATION

Filed Oct. 16, 1941  2 Sheets-Sheet 1

INVENTOR.

Franz D Prager

July 11, 1944.   F. D. PRAGER   2,353,358
PRECIPITATION AND COAGULATION
Filed Oct. 16, 1941   2 Sheets-Sheet 2
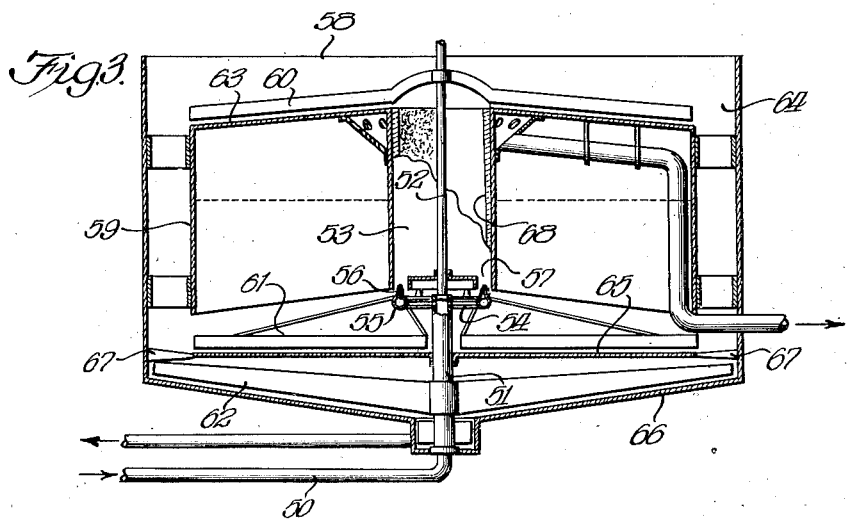
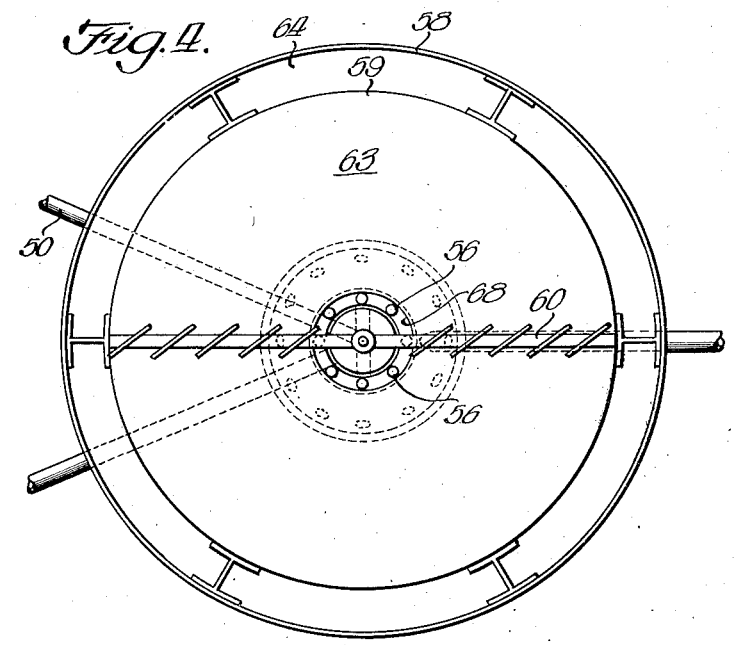
INVENTOR.
Frank D Prager Patented July 11, 1944

2,353,358

UNITED STATES PATENT OFFICE 2,353,358

PRECIPITATION AND COAGULATION

Frank D. Prager, East Chicago, Ind., assignor to Graver Tank & Mfg. Co., Inc., East Chicago, Ind., a corporation of Delaware Application October 16, 1941, Serial No. 415,219

9 Claims. (Cl. 210—16)

This invention relates to the precipitation, coagulation, and elimination of substances from water, process liquors, waste liquors, sewage, and the like. The invention will be described with particular reference to the softening of water by an improved lime-soda process. This example will serve to illustrate, but is not intended to limit the invention.

One of the objects of my invention, when so applied to water softening, is to accelerate the precipitation, coagulation, and elimination of calcium carbonate and other salts. Another object is to make such precipitation, coagulation, and elimination more complete. Another object is to provide simple and economical apparatus for such processes. Other objects are to increase the capacity of the apparatus, to reduce its size, particularly its height, and to do away with mechanical mixers, agitators, heavy-duty bearings, high-power motors, and the like.

A more particular object is to initially treat the raw water with chemical reagents and previously formed, selected products of reaction, whereby precipitation or coagulation is started, and then to cause progressive clarification of the resulting mixture concurrent with continued precipitation or coagulation, said previously formed, selected products of reaction being derived from the mixture at a point where the clarification and the precipitation or coagulation are partly completed.

Other particular objects are to effect such progressive clarification in a primary, downflow zone, and a secondary, upflow zone; to derive said selected products of reaction from a point adjacent to the start of the secondary zone; to cause the flow of water to decrease in velocity from the primary to the secondary zone; to cause the flow to be at a substantially uniform rate throughout the secondary zone; to effect said initial treatment substantially in a central zone, with rapid agitation; to produce such agitation by the incoming water; to have said primary clarification substantially in a peripheral zone, with gentle agitation, naturally caused by the conditions of the process; to have said secondary clarification substantially in a zone intermediate said central and peripheral zones; to select products of reaction for addition to the raw water by promptly removing from the mixture the spent, inactive sludge, the particles of which have substantially reached their limit of growth; to withdraw such particles from the center of the secondary zone; and to improve the distribution of the water in the upward sludge filtration forming part of the process.

Still other objects are to provide suitable inlet nozzles, clear water outlets, sludge scrapers, partitions, trays, and supports thereof. Finally, some additional objects will appear on consideration of the detailed description which follows.

Figure 2:
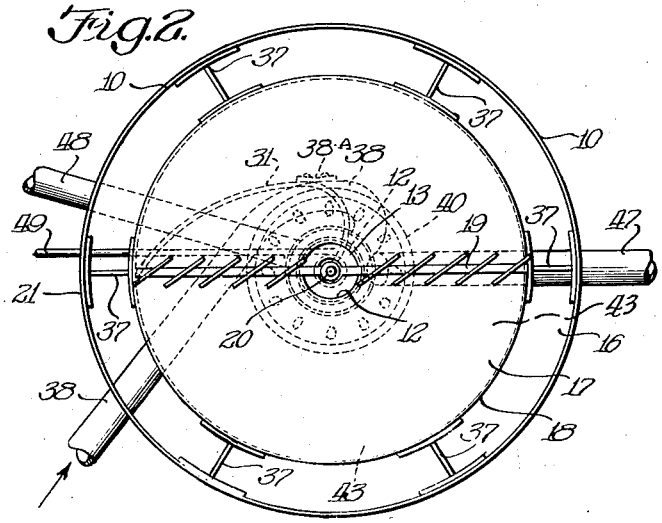

In the drawings Figure 1 is a sectional elevation of one embodiment of my invention. Figure 2 is a plan view of the same apparatus. Figures 3 and 4 are, respectively, sectional elevation and plan view of a modified embodiment.

The softener tank 10 contains a zone 11 for initial, chemical treatment, formed by a central cylindrical partition or standpipe 12 concentric with the tank and having a top discharge opening 13, below the liquid level 14 which is permanently maintained in the tank.

This discharge opening, which may be rounded as shown, communicates with a liquid transfer or coagulation chamber 15, which, together with a peripheral channel 16, forms the zone of primary clarification; the bottom 17 of the coagulation chamber being constructed of plate means extending outwardly and downwardly from the central discharge opening 13 to a peripheral rim 18 concentric with said opening. This bottom 17 forms a partition which separates the transfer or coagulation chamber 15, located in an upper part of the tank, from the lower part of said tank intermediate the zones 11 and 16, while allowing communication between the zones 11 and 16; thus the transfer zone bridges said lower, intermediate part of the tank. The slope of bottom 17 from the opening 13 to the rim 18 must be sufficient, in cooperation with scrapers hereinafter described, to cause reasonably prompt removal of the solids formed in the process, which are relatively large and heavy, and which tend to settle on this bottom. The slope will generally be uniform from the central opening 13 to the peripheral rim 18, in order to facilitate construction of the scrapers 19 which are slowly driven by a central shaft 20 and which serve to sweep the bottom 17. The shaft 20 may be driven by a motor in manner well known to the art.

The coagulation chamber extends beyond the rim 18 of the inclined bottom 17 to the wall 21 of the softener tank. It discharges downwardly between the rim 18 and wall 21, into the peripheral channel 16, which is substantially vertical. This channel is formed by the tank wall 21 and by another wall, partition, standpipe or apron 22, depending from the rim 18, concentrically with the tank; said apron 23 having its bottom rim 25 spaced from the tank wall to allow passage of liquid and solids through the lowermost portion 24 of the peripheral channel 16.

A tray or false bottom 26 is installed in the tank, concentrically therewith, and having its peripheral rim 27 spaced from the bottom rim 25 of the apron 23 by an annular opening 28. The opening 28 establishes communication between the primary and secondary clarification zones, which are disposed outside and inside of the apron 23, respectively; and around the rim 27, there is also communication between both clarification zones and a chamber 30 for spent sludge, below the tray 26.

A scraper means 31 is installed above this tray to sweep the same on rotation of the aforementioned drive shaft 20. Similarly a scraper means 32 sweeps the bottom 33 of the tank, which at the same time is the bottom of the spent sludge chamber 30. There may be a mud drum 34 with a mud paddle 35 in the center of this bottom. The drive shaft 20 carries and rotates the scrapers 19 of the coagulation chamber; it also carries and rotates the tray 26; and it finally carries and rotates the scrapers 32 of the bottom chamber and the mud paddle 35. The scraper means 31 above the tray 26 are held stationary in manner which will be described presently, while the tray itself rotates. This relationship, as well as that of scrapers and surfaces in the top and bottom chambers, is subject to change, as long as there is relative motion between each scraper and the surface to be scraped. It is preferred, however, to rotate the tray 26 together with the bottom scrapers 32, because those two structures are close to one another, and can suitably support and brace one another, by intermediate structural parts 36, which may be light, take little space, offer insignificant settling surfaces above the bottom, and thus be inexpensive and efficient. Similarly, the tray scraper 31 is close to the bottom part of the apron 23, and those two, together with other structures, can well be stationary. They may be supported, for instance, by brackets 37 spanning the peripheral channel 16 and supporting the central bell formed by the apron 23 and top plate 17, which in turn supports the central standpipe 12, and by means of the same, cooperates to support the hard water inlet pipe 38 and the tray scraper 31, the scraper being fastened to that inlet pipe by clips 38—A or the like, such means being well known to the art. In the preferred embodiment, as shown, the tray scraper and inlet pipe are substantially spiral-shaped; but, of course, there is considerable room for change as to this, particularly as to the shape of the inlet pipe.

This inlet pipe, as shown, enters the tank as a spiral in a horizontal plane; it then merges with an L-fitting 39, which turns upward and through which the drive shaft 20 passes, being centered by a suitable gland 40. The upper part of the L-fitting 39 merges with a reducer or nozzle 41 which, together with a blunt, conical or reduced inlet portion 42 of the central standpipe 12, forms an internal mixing circulator, aspirator or ejector; the nozzle 41 and inlet portion 42 having openings in vertical alignment and in communication with one another and being centrally traversed by the drive shaft 20. The inlet 42 of the central chamber also communicates with the secondary clarification zone 43 surrounding it, at a point adjacent to the tray 26, or at any rate, below the top plate 17.

When the tank is filled with water, and prior to the admission of newly incoming water, the liquid heads are equal, inside and outside of the aspirator nozzle, as well as the liquid heads are equal, inside and outside of the top opening of the mixing chamber. As water is admitted through the aspirator nozzle, this equilibrium is disturbed. The static head inside the top opening is raised, as compared with that in the surrounding, upper parts of the tank, causing outward flow through the transfer or coagulation zone, while the static head inside the aspirator nozzle in the bottom of the mixing zone is lowered, as compared with that in the surrounding, lower parts of the tank, causing inward flow into the mixing zone. Thus a closed circulation is maintained, which leads from the mixing zone through the transfer zone, the outer channel, and the bottom of the clarification zone back to the mixing zone. The liquid level 14, as mentioned, is permanently maintained, and thus, a through-put flow of water equivalent to that newly admitted to the mixing chamber will be discharged from the tank. In view of the pressure conditions described, this through-put flow tends to pass from the mixing chamber through the transfer chamber and outer channel and into the clarification chamber; it is removed from the top of the clarification chamber in manner to be hereinafter described.

The inlet fitting 42 may hold the nozzle fitting 41 by brackets 44, preferably shaped as vertical fins, leaving large openings therebetween, and the nozzle fitting may be smooth and streamlined on the outside, so that the nozzle circulator 41, 42 may draw material from the lower part of the secondary clarification zone; the direction of inflow from that zone being further controlled by a substantially horizontal flange 45 at the outside of the inlet piece 42, above the nozzle 41.

The dimensions of the tank, the concentric bell, and the central standpipe, and the construction and operation of the circulator nozzle are preferably such that the flow velocity decreases from the mixing chamber to the primary chamber, and from that to the secondary chamber. For this purpose the mixing chamber 12 has relatively small area; the primary channel 16 has greater area; and the secondary chamber 43 has still greater area; so that the coagulation starting in the outward flow zone 15 may continue more gently in the downward and inward flows in zones 16 and 43. Aside from the decrease of flow between the primary and secondary chambers, which is conducive to progressive clarification, there is a change from downward to upward direction of flow. Thus, the solids of intermediate size, formed in the process, which may be carried along by the downflow in the primary zone, will no longer be carried along in the secondary zone; they will remain in suspension, and form a sludge bed, adjacent to the end of the zone 16, 43 in which clarification takes place; that is a sludge bed is formed, in the submerged, secondary clarification chamber. The upper surface 43—A of the sludge bed is the limit of that part of the apparatus in which solids are present in the water, and the same surface marks the start of a relatively small space 43—B for the final upward flow of clarified water. While being suspended in the sludge bed, the solids gradually increase in size and weight, and finally are heavy enough to settle out of the sludge bed and down to the tray, from which they are promptly removed by the scraper, to be accumulated in the bottom chamber 30 until they are finally withdrawn through the pipe 48.

Softened and clarified water is withdrawn from the secondary clarification chamber through a collector funnel 46 surrounding the central standpipe 12 in the clear water zone 43—B above the sludge bed, and a clear water outlet pipe 47 attached to the collector.

Softening reagents are introduced into the water either before the water enters the tank, or preferably at the start of the mixing chamber, closely preceding the same; that is, by a pipe 49 leading to the L 39 or nozzle 41, so that the chemicals need not be pumped to the plant but may be rapidly drawn into and distributed in the water at the point of lowest static head and greatest flow velocity, and that practically the whole reaction between the chemicals and the hardness constituents may occur in the mixing chamber, in contact with the previously formed, solid products of reaction, entering the nozzle.

The area of the mixing chamber 11 and the velocity of the influent flow of raw liquid received therein, together with the recirculated liquid, are such as to prevent sedimentation of the solids in the mixing chamber. Moreover, there is turbulence in the mixing chamber due to the high velocity of the jet of water injected through the inlet nozzle, the incoming streams of material from the secondary zone, and the abruptly expanding design of the mixing chamber immediately following the nozzle. Such turbulence serves to keep the nozzle and inlet free from lime deposits. It also serves to provide further mixture of chemicals and water; and it causes the solid material from the secondary zone, and other solids, to be mixed with the water and chemicals.

The three constitutes, water, chemicals and solids are intimately mixed and agitated. Solids of almost any kind, when so mixed with the water and chemicals, promote the formation of large and heavy particles of calcium carbonate and other precipitates, presumably by deposition of new precipitates on previously formed precipitates or solids. However, the solids used in such a process may be more or less adapted to the same. I make use of selected, highly efficient solids, as will be appreciated on consideration of what follows.

The material which leaves the mixing chamber and enters the primary clarification chamber is a homogeneous mixture of water and solids, due to the turbulence prevailing in the mixing chamber. While homogeneously mixed, this material contains solids of different character, not only due to the inevitable presence of different salts, but also due to the fact that all the precipitates of one salt are not identically precipitated on previously formed solids, and that all of them do not reach the same size, density, and general stage of development, or completeness, at the same time. Therefore, the material which enters the primary clarification chamber contains, for one thing, large and heavy particles of calcium carbonate, partly flushed through the mixing chamber from the secondary zone and partly further increased in size due to treatment in the mixing chamber; it also contains particles, from the same sources as well as from the raw water and chemicals alone, of generally smaller size and lower weight; of course it contains pretreated, softened water from the contact material; and finally there is the newly treated water, just relieved, or about to be relieved, of the newly formed precipitates.

In the last mentioned liquid portions, which of course are interspersed with the other material, precipitation continues within the primary clarification zone 15, 16. In general, however, the liquid in the primary clarification zone is subject to the concurrent processes of coagulation and clarification. When referring to coagulation, I mean that process by which precipitates, on being attracted to or contacted with one another, adhere to one another and grow in size and density; regardless whether the ultimate particles may be crystals, flocs of gel, or of any other physical character. Such coagulation occurs due to the presence of precipitates susceptible of growth or adherence. Coagulation is aided by the continued but more gentle motion of the liquid which issues from the turbulent mixing chamber. No violent spray, surface aeration or particle destruction, as it occurs in certain aerators, is allowed. Coagulation is also furthered by the slight eddies which are always present in this zone, due to large particles settling through the liquid, particularly, the curtain of sludge which is swept into the peripheral channel by the scrapers in the coagulation chamber; and coagulation is finally promoted by thermal convection currents, which generally will develop in the peripheral channel due to differential temperatures of the tank wall and the water within. Therefore, as the material traverses the primary clarification zone, the balance between small or light particles and large or heavy ones is changed in favor of the latter. At the same time, there is clarification by sedimentation, that is, a downward movement of those large and heavy particles at a velocity somewhat higher than the downflow of the water. I allow this sedimentation to continue in the peripheral channel by making this channel wide enough and reducing the flow velocity, so that solids may settle into the bottom chamber. I so eliminate the heaviest and largest solids from the water to be subjected to secondary clarification, because those solids, in general, have practically reached the limit of their growth in size and density. Greater benefits are derived from their prompt elimination than from forced retention of such solids in the water, or accumulation thereof in contact with a supernatant mixture in the secondary zone.

In the secondary zone then, there is received a mixture of material, formed in the primary zone, and containing precipitates, ranging from intermediate size down to the smallest, lightest and least complete. All of these are susceptible of growth. The incomplete precipitates may, and generally will, include some which are yet in a sort of transition from the dissolved to the solid or fully precipitated form. The complete precipitation of such particles may have been retarded by a number of natural influences. Earlier attempts to accelerate such complete precipitation have been unsuccessful or only partly successful, resulting either in incomplete softening where there was redissolution, or resulting in after-precipitation. The task of accelerating precipitation in those portions of the water wherein it tends to be slow is very important, and also very delicate. Such acceleration is achieved in my improved process. It largely occurs in the secondary zone, aided by the circulation of parts of the material through the central mixing zone.

The mixture enters the secondary zone 43 radially, inwardly, at the periphery, at a very low velocity. Eddies are absent. The liquid is then upwardly displaced through the secondary zone, from the inward flows of circulating liquid-sludge mixture, to the top of the secondary zone, for final and complete clarification, in amounts corresponding to the influent flow of raw liquid. The incidents of secondary clarification in this upflow zone receiving small and intermediate sized precipitates are substantially as follows: The upflow is uniformly slow so that the particles of large and intermediate size fail to be carried along; they either settle on the tray and are removed, or remain in suspension, like filter granules in a filter with rapid upflow or backwash flow. The particles in suspension, that is those of intermediate size form an efficient upflow filter for the water and the smallest, incomplete precipitates. In filters, distribution of the water is a problem of prime importance. This has previously been neglected, to a large extent, in clarifiers using upward sludge filtration. In such apparatus, the problem is further complicated by the feature that the filter material is subject to sedimentation, elimination, re-supply, re-formation, and other changes. On consideration of the velocities, specific gravities and other characteristics of the material at the several points of my secondary treatment zone, which develop naturally and which readily occur to persons skilled in this art, it will be found that distribution, filtration, coagulation, and sedimentation are greatly improved, particularly by the effect of the central means for withdrawal of contact material. Resuming these characteristics briefly, and referring mainly to the particles of intermediate size, which enter the secondary zone together with those of small size: these intermediate sized particles, being subject to growth and being subjected to the gentle commotion of the rising liquid, are gradually built up, by precipitation thereon of the very smallest and lightest particles, until they attain much larger size and weight. In this latter condition, the particles which were of intermediate size are no longer suspended, but are allowed to settle out of the rising flow as provided in accordance herewith. Thus the said particles, now built up to large size, are eliminated from the suspended sludge bed in the secondary zone; they are accumulated below that bed as a dense and not suspended sludge, and finally scraped off. This change from small and intermediate sized into large sized particles, and this elimination of the latter, goes on continuously in the suspended sludge bed. The particles which settle rapidly and which, as a rule, are relatively poor as contact material, because they have practically reached the limit of growth, are thus removed continuously, and more active particles are continuously re-supplied to the sludge bed, from preceding zones. Therefore, a relatively short travel of the water through the secondary zone, or relatively small size of the zone itself, will be sufficient to obtain practically perfect softening, and removal of all material susceptible of after-precipitation. Also, the inlet nozzle of the mixing chamber receives a contact material of peculiar activity, and of greatest benefit for the initial chemical treatment, and for the process as a whole. Both the sludge filter in the secondary chamber and the contact material branched off into the mixing chamber are substantially composed of selected solids, of the greatest value for the processes occurring in those chambers.

The distribution of the water over the area of the sludge filter in the secondary zone is further prompted by that design of the nozzle inlet 41, 42, which provides a smooth, upward taper of the nozzle 41, and a laterally extending flange on the inlet 42, whereby disturbance of the sludge bed above the nozzle inlet is avoided, and practically, uniformity of flow rate in the sludge filter is achieved.

Aside from the fact that such uniformity is desirable in the underlying part of the sludge filter, as well as above, the nozzle inlet 41, 42 could theoretically be located at any desired elevation of the sludge bed, except at the very top, where disturbance of the bed and recirculation of clarified water would result. Practically, however, I prefer to have this nozzle inlet adjacent to the bottom of the sludge filter, for the additional reason that when so located, this inlet receives a contact material freshly discharged from the primary chamber, susceptible of considerable further growth, which is particularly desirable in the mixing chamber. Such material which is very susceptible of further growth is constantly resupplied to the inward flow zone in the underlying part of the sludge filter between the opening 28 and the nozzle 41, whereas the spent sludge is collected in the bottom chamber, far from the reach of the intake nozzle.

The modified apparatus of Figures 3 and 4 has an inlet pipe 50 entering the tank at the center of its bottom. This pipe may be continued by a rotating standpipe 51, forming the lower part of the scraper drive shaft 52; and this pipe may discharge into the mixing chamber 53 through radial branch pipes 54, an annular distributor pipe 55, and nozzles 56 thereon, rotating in an inlet slot 57 at the bottom of the mixing chamber. Thus, I may provide a relatively wide mixing chamber; and I may make the whole tank 58 and the central bell 59 relatively wide, especially in large sized plants. In the design as shown, each of the three sets of scrapers 60, 61, and 62, which operate, respectively, over the bottom 63 of the coagulating chamber 64, the tray 65, and the tank bottom 66, is rotated by the single central shaft or pipe 51, 52. This is allowable where sufficient room and depth is available so that, for instance, supporting ribs 67 may be provided for the tray 65, which ribs, of course, must not interfere with the bottom scraper 62.

In some instances, I may provide the central mixing chamber 53 with a heat insulating lining 68 in order to prevent any temperature differences which may exist between the raw water entering the mixing chamber, and the water in the secondary zone from upsetting the sludge bed in the secondary zone.

The process and the apparatus can be modified in a number of other ways, depending on materials used for construction, character of the raw liquid, type and degree of treatment desired and many other variables, coming within the scope of this invention.

I claim:

1. A process of liquid treatment by the formation and removal of sludge in a liquid body maintained in a tank, which body is divided by two concentric partitions into an inner mixing zone of small area, an outer channel of greater area, and an intermediate clarification zone of still greater area, with a transfer zone bridging said clarification zone, said transfer zone being located in an upper part of said tank, and formed by additional partition means which separate the transfer zone from the clarification zone but allow communication between the mixing zone and the outer channel through the transfer zone, said process comprising the steps of feeding an influent flow of the liquid to be treated and any chemical reagents required for the formation of sludge into said inner mixing zone, circulating liquid flows from a lower part of said clarification zone inwardly into said mixing zone, upwardly through the same, outwardly through said transfer zone into said outer channel, downwardly through said outer channel, and then in inward flows back into and through said lower part of said clarification zone, said circulating flows being mixed with said influent flow and reagents in said mixing zone and having such velocities and directions as to be gently agitative in said outward, downward and inward parts thereof, so as to be conductive to the coagulation of sludge, upwardly displacing liquid from said inward flows through said clarification zone to the top thereof in amounts corresponding to said influent flow, removing treated liquid from the top of said clarification zone, and removing sludge formed by said reagents from said lower part of said clarification zone.

2. A process of liquid treatment by the formation and removal of sludge in a liquid body maintained in a tank, which body is divided by two concentric partitions into an inner mixing zone of small area, an outer channel of greater area, and an intermediate clarification zone of still greater area, with a transfer zone bridging said clarification zone, said transfer zone being located in an upper part of said tank, and formed by additional partition means which separate the transfer zone from the clarification zone but allow communication between the mixing zone and the outer channel through the transfer zone, said process comprising the steps of passing rapid upward flows of fluid materials, including an influent flow of liquid to be treated and any chemical reagents required for the formation of sludge into said inner mixing zone, in such manner as to reduce the static liquid head in a lower part of the inner mixing zone as compared with the static liquid head in the surrounding, lower parts of the tank, while increasing the static liquid head in an upper part of the inner mixing zone as compared with the static liquid head in the surrounding, upper parts of the tank thereby aspirating inward liquid flows from a lower part of said clarification zone into said mixing zone, mixing the aspirated liquid with said fluid materials in said mixing zone, guiding the mixed liquids upwardly through said mixing zone, outwardly through said transfer zone into said channel, downwardly through said channel, and then back into said inward flows, said outwardly, downwardly and inwardly directed flows having such velocities as to be gently agitative and conducive to the coagulation of sludge, upwardly displacing liquid from said inward flows through said clarification zone to the top thereof in amounts corresponding to said influent flow, removing treated liquid from the top of said clarification zone, and removing sludge formed by said reagents from said lower part of said clarification zone.

3. A process of liquid treatment of the formation and removal of sludge in a liquid body maintained in a tank, which body is divided by two concentric partitions into an inner zone of small area, an outer zone of greater area, and an intermediate zone of still greater area, with a transfer zone bridging said intermediate zone, said transfer zone being located in an upper part of said tank, and formed by additional partition means which separate the transfer zone from the intermediate zone but allow communication between the inner zone and the outer zone through the transfer zone, said process comprising the steps of upwardly feeding an influent flow of the liquid to be treated and any chemical reagents required for the formation of sludge into a lower part of said inner zone, restricting said influent flow to a jet adjacent said lower part of said inner zone, thereby increasing the velocity head and reducing the static head of said influent flow and circulating liquid flows from a lower part of said intermediate zone inwardly into said jet and said lower part of said inner zone, passing the influent flow together with the circulated liquid upwardly through said inner zone, outwardly through said transfer zone into said outer zone, downwardly through said outer zone, and then in inward flows back into and through said lower part of said intermediate zone, said circulating flows being mixed with said influent flow and reagents in said mixing zone and having such velocities as to be gently agitative and conducive to coagulation of sludge in said outward, downward and inward parts thereof, upwardly displacing liquid from said inward flows through said intermediate zone to the top thereof in amounts corresponding to said influent flow, removing treated liquid from the top of said intermediate zone, and removing sludge formed by said reagents from said lower part of said intermediate zone.

4. A process of liquid treatment by the formation and removal of sludge in a liquid body maintained in a tank, which body is divided by two concentric partitions into an inner mixing zone of small area, an outer channel of greater area, and an intermediate clarification zone of still greater area, with a transfer zone bridging said clarification zone, said transfer zone being located in an upper part of said tank, and formed by additional partition means which separate the transfer zone from the clarification zone but allow communication between the mixing zone and the outer channel through the transfer zone, said process comprising the steps of feeding an influent flow of the liquid to be treated and any chemical reagents required for the formation of sludge into said inner mixing zone, circulating flows of liquid and suspended sludge from a lower part of said clarification zone inwardly into said mixing zone, to be mixed with said influent flow and reagents, upwardly and turbulently through said mixing zone, then outwardly through said transfer zone into said channel and downwardly through the same at a velocity conducive to gentle agitation, and then in inward flows back into and through said lower part of said clarification zone, maintaining by said circulating inward flows a condition of said liquid body in said lower part of said clarification zone, conducive to sedimentation of the most settleable particles of said sludge, entrainment with said inward flows of the least settleable particles of said sludge, and suspension of intermediately settleable particles of said sludge, upwardly displacing liquid from said inward flows through said suspended sludge to the top of said clarification zone in amounts corresponding to said influent flow, removing treated liquid from the top of said clarification zone, and removing sedimented sludge from said lower part of said clarification zone.

5. A process of liquid treatment by the formation and removal of sludge in a liquid body maintained in a tank, which body is divided by a tray into an upper treatment zone and an underlying sludge zone, said upper treatment zone being subdivided by two concentric partitions into an inner mixing zone of small area, a peripheral channel of greater area, and an intermediate clarification zone of still greater area, with a transfer zone bridging said clarification zone, said transfer zone being located in an upper part of said tank, and formed by additional partition means which separate the transfer zone from the clarification zone but allow communication between the mixing zone and the peripheral channel through the transfer zone, said process comprising the steps of feeding an influent flow of the liquid to be treated and any chemical reagents required for the formation of sludge into said inner mixing zone, circulating liquid from a lower part of said clarification zone inwardly into said mixing zone, upwardly through the same, outwardly through said transfer zone into said channel, downwardly through said channel at a velocity conducive to gentle agitation of the liquid and sedimentation of large particles of said sludge, and then in inward flows back into and through said lower part of said clarification zone, upwardly displacing liquid from said inward flows through said clarification zone to the top thereof in amounts corresponding to said influent flow, whereby further sedimentation of sludge occurs, removing treated liquid from the top of said clarification zone, removing the sludge settling from said coagulation and clarification zones into said underlying zone, and finally removing sludge from said underlying zone.

6. Liquid treatment apparatus comprising a tank, a cylindrical partition centrally and concentrically located in said tank, extending upwardly from above the bottom of said tank and providing interiorly a mixing chamber of relatively small area and exteriorly a clarifying chamber of greater area, a larger cylindrical partition concentrically located in said tank, extending upwardly from above the bottom of said tank, and separating said clarifying chamber from a surrounding channel of greater area than said mixing chamber but smaller area than said clarifying chamber, liquid transfer means between said partitions affording communication between said mixing chamber and said channel, said mixing chamber and said channel being open to a lower part of said clarifying chamber, means adapted to supply raw liquid and chemical reagents to said mixing chamber and to circulate liquid from the lower part of said clarifying chamber inwardly into and upwardly through said mixing chamber, outwardly through said liquid transfer means, downwardly through said channel, and inwardly back to said lower part of said clarification chamber, an outlet for treated liquid adjacent the top of said clarification chamber, sludge conveyor means adapted to rotate about an axis concentric with said clarifying chamber and to remove settled sludge from various points on the bottom of said clarifying chamber to localized points on said bottom, and sludge outlet means adjacent said localized points.

7. Apparatus according to claim 6 wherein said means to supply liquid and reagents and to circulate liquid comprises an inlet pipe for raw liquid, terminating adjacent the lower part of said central cylindrical partition, and nozzle means at the end of said inlet pipe, adapted to discharge a jet of raw liquid into said lower part of said mixing chamber and thereby to circulate liquid from said clarifying chamber into said lower part of said mixing chamber.

8. Apparatus according to claim 6 comprising as a further element a baffle providing a tray below said mixing chamber and above the bottom, said sludge conveyor means being adapted to remove said large and heavy solids from said lower part of the clarifying chamber to a point below said tray.

9. Apparatus according to claim 6 comprising as a further element a baffle carried by and rotatable with said sludge conveyor means and providing a tray above the bottom of the tank, below said mixing chamber, and extending horizontally part of the way from the center to the periphery of the tank.

FRANK D. PRAGER.